(12) United States Patent
Van Ham

(10) Patent No.: US 8,950,967 B2
(45) Date of Patent: Feb. 10, 2015

(54) ARTICULATED JOINT

(75) Inventor: Ronald Van Ham, Sint-Kwintens-Lennik (BE)

(73) Assignee: Vrije Universiteit Brussel, Brussels (BG)

( * ) Notice: Subject to any disclaimer, the term of this patent is extended or adjusted under 35 U.S.C. 154(b) by 1291 days.

(21) Appl. No.: 11/915,265

(22) PCT Filed: May 19, 2006

(86) PCT No.: PCT/BE2006/000056
§ 371 (c)(1),
(2), (4) Date: May 7, 2008

(87) PCT Pub. No.: WO2006/125282
PCT Pub. Date: Nov. 30, 2006

(65) Prior Publication Data
US 2008/0205975 A1 Aug. 28, 2008

(30) Foreign Application Priority Data
May 23, 2005 (EP) .................................... 05447118

(51) Int. Cl.
*B25J 17/00* (2006.01)
*B25J 19/00* (2006.01)

(52) U.S. Cl.
CPC ............ *B25J 19/0016* (2013.01); *Y10S 901/28* (2013.01)
USPC .................. 403/64; 403/81; 403/111; 901/28

(58) Field of Classification Search
CPC ..... B25J 19/0016; B25J 19/0008; B25J 9/042
USPC ............ 403/64, 81, 111, 145–149, 150, 157; 901/28, 29; 74/89.22, 490.01–490.07; 464/125, 126, 136; 414/680, 722; 248/578, 292.11, 280.11, 575, 292.12, 248/292.13
See application file for complete search history.

(56) References Cited

U.S. PATENT DOCUMENTS

| 3,003,737 | A | * | 10/1961 | Mehr ........................ 248/279.1 |
| 3,850,307 | A | * | 11/1974 | Motoda ........................ 212/237 |
| 4,076,131 | A | * | 2/1978 | Dahlstrom et al. ........... 414/730 |
| 4,502,588 | A | * | 3/1985 | Whiteside et al. ............ 198/409 |
| 4,659,280 | A | * | 4/1987 | Akeel ............................ 414/720 |

(Continued)

FOREIGN PATENT DOCUMENTS

| EP | 1 442 846 A1 | 8/2004 |
| EP | 1442846 A1 | * 8/2004 |

(Continued)

OTHER PUBLICATIONS

Spiral Torsion Springs. Datasheet [online]. Springs & Things Incorporated, 2013 [retrieved on Dec. 20, 2013]. Retrieved from the Internet: <URL: http://www.springsandthings.com/pdf/spiral-torsion-springs.pdf>.*
Translation of JP52027157. Dec. 8, 2013.*
Hurst, Jonathan W. et al. "An Actuator with Physically Variable Stiffness for Highly Dynamic Legged Locomotion." International Conference on Robotics & Automation, New Orleans, LA, Apr. 2004.

*Primary Examiner* — Michael P Ferguson
*Assistant Examiner* — Matthieu Setliff
(74) *Attorney, Agent, or Firm* — The Marbury Law Group, PLLC

(57) ABSTRACT

The present invention is related to an articulated joint usable in e.g. robotics and rehabilitation, consisting of a first and second body, rotatably connected to each other, and comprising a third body, equally rotatable around a rotation axis, wherein the third body acts as a lever arm. This lever arm is connected via a spring to a pre-tension mechanism, which may be mounted on the second body, while the rotation of the lever arm with respect to the first body is controlled by an actuator. This construction leads to a joint wherein the position can be controlled independently from the compliance of the joint, thereby yielding a mechanism with improved characteristics compared to existing designs.

27 Claims, 12 Drawing Sheets

(56) References Cited

U.S. PATENT DOCUMENTS

| | | | |
|---|---|---|---|
| 5,667,325 A * | 9/1997 | Millard et al. | 403/81 X |
| 5,934,147 A * | 8/1999 | Parker | 74/490.05 |
| 6,082,552 A * | 7/2000 | Pollock et al. | 211/18 |
| 6,516,681 B1 * | 2/2003 | Pierrot et al. | 74/490.01 |
| 7,428,855 B2 * | 9/2008 | Duval | 74/516 |
| 7,752,939 B2 * | 7/2010 | Ono | 74/490.03 |
| 2002/0162414 A1 * | 11/2002 | Lundstrom et al. | 74/490.01 |

FOREIGN PATENT DOCUMENTS

| | | | | |
|---|---|---|---|---|
| JP | 1977-027157 | | 3/1977 | |
| JP | 52027157 A | * | 3/1977 | ................ B25J 1/00 |
| JP | 52027158 A | * | 3/1977 | |
| JP | 52079468 A | * | 7/1977 | ............... B25J 11/00 |
| JP | 2004-174650 | | 6/2004 | |
| WO | WO 02/28600 A2 | | 4/2002 | |

* cited by examiner

ARTICULATED JOINT

FIELD OF THE INVENTION

The present invention is related to an actuated articulated joint, to be used in robotics, in particular in compliant robots.

STATE OF THE ART

Human joints are actuated by at least 2 muscle groups, thereby allowing to change the compliance, the opposite of stiffness, of the joint and to control the equilibrium position. By controlling both compliance and equilibrium position, a variety of natural motions is possible. While the shape of most mechanical bipeds is inspired by the human body, stiff electrical motors are commonly used to actuate the joints. Besides these fully actuated bipeds, there are the passive walkers, which use the natural dynamics of the system, tuned in such a way that humanlike walking motion is generated. The major drawback is that they have only one walking speed, since the eigenfrequency is determined by the construction and fixed compliance of the actuator.

Another important application for adaptable compliance is safe robots to interact with humans. When precision is required the joints are preferably stiff, when moving from one point to another, the joints can be compliant to be able to operate in the vicinity of humans.

Nowadays more and more research groups working on bipeds start to believe the natural biped type of walking is a combination of both approaches, requiring actuators with adaptable compliance, resulting in energy-efficient walking at different speeds. Also in robotic rehabilitation and robots that interact with humans compliance gives extra possibilities and increases safety.

One of the first realizations of this kind was the MIT Series Elastic Actuator disclosed by Pratt and Williamson in 'Series elastic actuators', Proceedings 1995 IEEE-IROS Conference, Pittsburgh, USA, pp. 399-406, which is an actuator in series with a spring. With this actuator a joint can be positioned while having an inherent, but fixed compliance. For shock absorbance this is a useful approach, but for natural dynamics this approach is limited to be used at one eigenfrequency since the spring constant is fixed. This is comparable to passive walkers, which are able to walk energy efficiently and very similar to humans, though restricted to a single walking speed.

In Waseda, Japan, a robot was built with variable stiffness joints, as described by Yamgushi et al. 'Realization of dynamic biped walking varying joint stiffness using antagonistic driven joints', 1998 Proceedings of the IEEE International Conference on Robotics and Automatisation, Leuven, Belgium, pp. 2022-2029. The stiffness can be adjusted by changing the position of pulleys over which the driving wire runs. This results in a fairly complex rotary nonlinear spring mechanism. At Carnegie Mellon University the AMASC is developed (Hurst, et al. 'An actuator with physically variable stiffness for highly dynamic legged locomotion', 2004 Proceedings of the IEEE International Conference on Robotics and Automation, New Orleans, USA, pp. 4662-4667). This actuator with mechanically adjustable series compliance has a linear spring characteristic, but the mechanism is too complex to be integrated into a biped.

At the Vrije Universiteit Brussel the Robotics and Multibody Mechanics research group has developed the PPAM (Daerden F.), 'Conception and realization of pleated pneumatic artificial muscles and their use as compliant actuation elements', PhD Dissertation, Vrije Universiteit Brussel, July 1999. These pneumatic muscles can only pull and not push, requiring an antagonistic setup, which results in 2 controllable variables—the pressures in both muscles—determining the compliance and equilibrium position of the joint. At the University of Pisa, Italy, the Variable Stiffness Actuator (VIA) has been designed (Proceedings of the 2005 IEEE ICRA, Barcelona, Spain, April 2005). This relatively simple mechanism uses 3 parallel axes, one of which is the joint axis, and the two others are actuated by two motors. The three axes are connected by a belt tensioned by 3 spring mechanisms. At Georgia Institute of Technology, USA, a Biologically Inspired Joint Stiffness Control, has been designed (Proceedings of the 2005 IEEE ICRA, Barcelona, Spain, April 2005). The set-up can be described as two antagonistically coupled Series Elastic Actuators [3], where the springs are made non-linear. The two latter set-ups are relatively easy to build, however to change the equilibrium position or compliance both actuators have to be used. At Northwestern University the MARIONET is developed (http://www.smpp.northwestern.edu/~smpp_pub/sulzer_ICORR_05.pdf). This Exotendon-Driven Rotary Series Elastic Actuator for Exerting Joint Torque is a rotational joint with adaptable compliance and equilibrium position. Due to the design the force in the cable has to be controlled, while the position can differ. This active control makes it suitable for rehabilitation and safe robots, but not for energy efficient walking, since even during passive movements, the tension motor will absorb energy.

AIM OF THE INVENTION

The present invention aims to provide an actuated articulated joint with controllable compliance, which is constructed in a straightforward and non-complex way, and which is easy to control.

BRIEF DESCRIPTION OF THE DRAWINGS

FIG. 9A shows additionally two springs to set the compliances of both rotations.

DESCRIPTION OF THE INVENTION—PREFERRED EMBODIMENTS

Figure 1A:
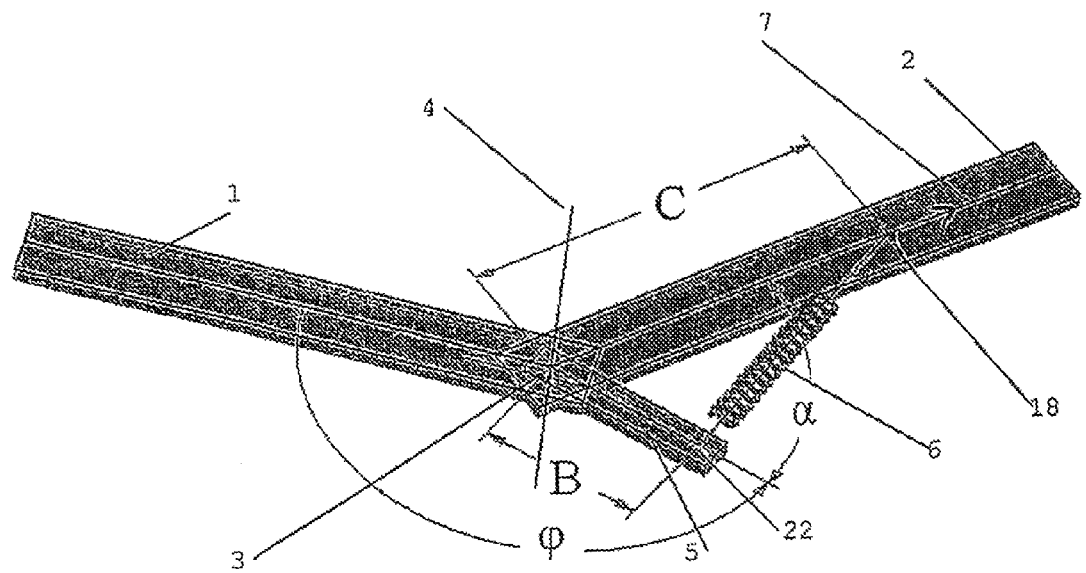
FIGS. 1a and 1b represent schematic views of an articulated joint according to the invention.

The present invention is related to an articulated joint, of which the compliance and the equilibrium position can be controlled independently, as described in the appended claims. The principle of a mechanism according to the invention is shown in FIGS. 1a and 1b.

The mechanism of the invention comprises a first body 1, an elongated member or arm, and a second body 2. For the sake of readability of this text, the bodies 1 and 2 will be called 'left and right arm' respectively, though it is made clear that their exact shape is not a limiting factor with regard to the scope of the present invention. The arms are joined in a rotation centre 3, so that one arm can rotate with respect to the other, around a rotation axis 4. In the embodiment shown, the rotation takes place in one plane (one rotational degree of freedom), though alternative embodiments are possible with rotation taking place in multiple planes (see further in text). A third body 5 is attached to the first body, in such a way that it can rotate around the same rotation axis 4 around which the first and second body can rotate. However, the rotation axis of the third body could be different from the rotation axis of body 1 and body 2 (parallel, intersecting or not-intersecting), resulting in a coupling between the equilibrium position and the compliance of the joint (see further). This third body 5 can be simply an arm, as shown in FIG. 1, but as is the case for the bodies 1 and 2, the actual shape of this third body is not determined within the scope of the invention. The third arm 5 will from now on be called 'lever arm'. To a point 22 on the lever arm, on a distance B from the lever arm's rotation centre 3, one end of a spring 6 is attached, while the other end of the spring is attached to one end of a cable 7 or equivalent (strip, rope, . . . ). In stead of a linear spring, as shown in the drawings, any equivalent elastic element may be used, such as an elastic band, for example.

In the following text, in order to improve conciseness and readability of the application, the point 22 will be called an 'eccentric' point of the lever arm. Throughout the application, an 'eccentric' point on a rotatable body is to be understood as a point which does not coincide with the rotation centre of the body, in other words: the eccentric point does not lie on the rotation axis around which the body is rotatable.

Figure 1B:
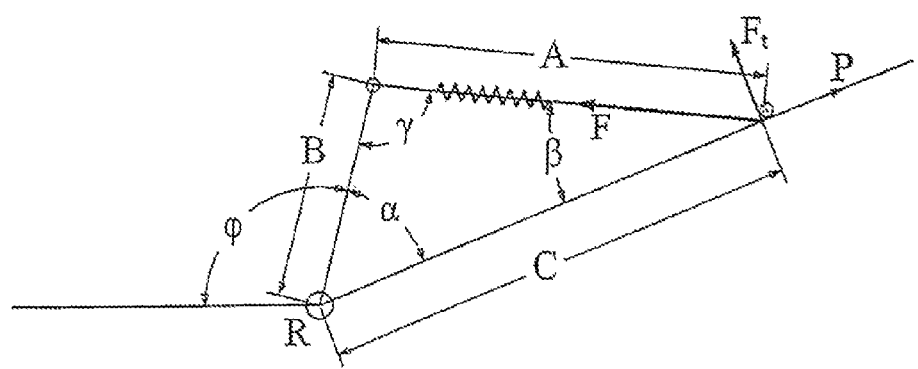

The angle φ between the lever arm and the left arm is set by an actuator (not shown in FIG. 1a). This actuator can perform an automatic actuation, e.g. a servomotor, or a manual actuation, a manual setting by a knob. The spring is arranged in such a way that it may exert a force between point 22 on the lever arm and an eccentric point 18 on the right arm. Point 18 is defined by a means for guiding the cable 7, such as a pulley, a protrusion or a hole in the right arm, as explained further. The cable 7 is then further connected at its other end to a pre-tension mechanism (not shown in FIG. 1a), mounted on the right arm. The pre-tension mechanism, automatically or not automatically adjustable, is able to shorten the cable, thereby increasing the elongation and thus the pre-tension of the spring 6, or likewise to lengthen the cable and decrease the pre-tension. This creates a joint with an adaptable compliance, as explained more in detail in the following paragraphs. Other embodiments are possible, wherein the position of the spring and the pre-tension means are different, as explained further. The operation of the joint will however first be explained in detail based on the embodiment of FIG. 1.

Figure 2A:
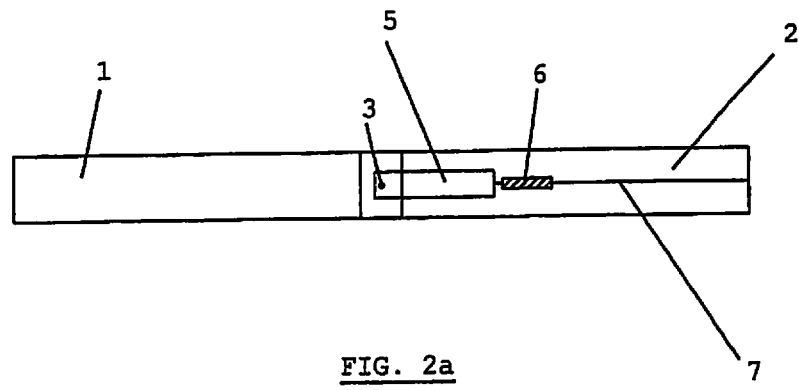
FIG. 2a-b-c illustrate the movement of the joint according to the invention.
Figure 2B:
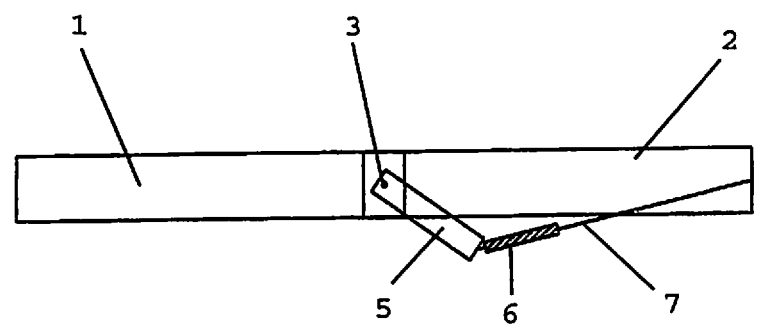
Figure 2C:
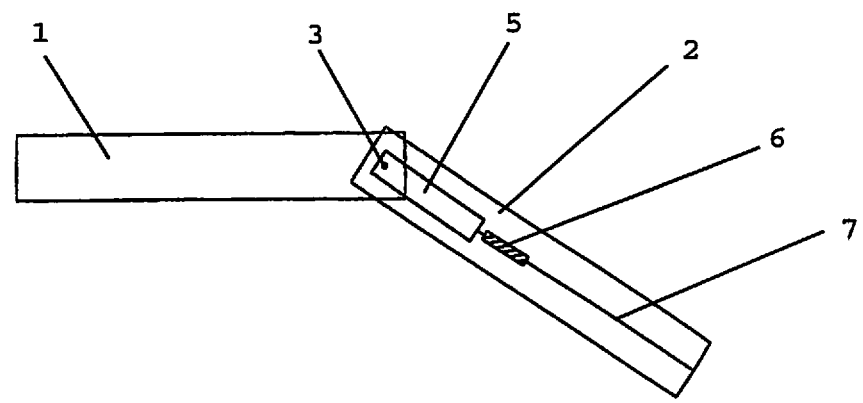

The elongation of the spring 6 is caused on one hand by the pre-tension mechanism and on the other hand by α, the angle between the lever arm 5 and the right arm 2. When α differs from zero, the force due to the elongation generates a torque, which will try to line up the right arm with the lever arm 5. When the angle α is zero—this is the equilibrium position—the spring will not generate any torque. The actuator that determines φ, the angle between the left arm 1 and the lever arm 5, thereby sets the equilibrium position. Assume for example, that no external forces work on the joint and all three arms are parallel (FIG. 2a). When the actuator that determines the angle φ, moves the lever arm (FIG. 2b), the spring will generate a torque that moves the right arm towards the lever arm, until a new equilibrium position is reached (FIG. 2c). Note that the torque is dependent on the angle α and on the pre-tension of the spring. It is possible that the actual equilibrium position (α=0) cannot be reached, due to external forces (e.g. gravity), so that the arm will settle on a position differing from the equilibrium position. This difference depends on the external forces and on the joint's compliance, meaning that when the compliance and α are known, the torque can be calculated. The elongation and thus the pre-tension of the spring 6 can be changed, by varying the pre-tension mechanism, which is done independently from the setting of the angle φ, thus creating a joint with an adaptable compliance. In other words, the joint is equivalent to a torsion spring with an adaptable spring constant and a controllable equilibrium position. The same movement shown in FIGS. 2a to 2c will take place with a different speed and compliance for different pre-tension values of the spring 6. This structure makes it possible for example to operate this joint in a dynamic way, by controlling both the position of. the arms, and the spring constant of the equivalent torsion spring, to obtain optimal flexibility in the resulting movement.

The torque can be calculated as follows, referring to FIG. 1b:

R=Rotation point
T=Torque applied by the joint of the invention
F=Force due to extension of the spring
$F_t$=Torque generating part of F
k=Spring constant, assuming linear spring
B=Length of lever arm, which controls equilibrium position
C=Distance between point 3 and point 18 in FIG. 1
P=Pre-tension of the spring, expressed as the elongation with respect to the rest-length of the spring.
α=Angle between lever arm and right arm
φ=Angle between left body and lever arm, equilibrium position $T = C \cdot F_t = C \cdot F \cdot \sin\beta$ and $F = k \cdot (A - |C-B| + P)$ give
$T = C \cdot \sin\beta \cdot k \cdot (A - |C-B| + P)$ Using the sine rule $$\frac{\sin\beta}{B} = \frac{\sin\alpha}{A}$$

and the cosine rule $A = \sqrt{B^2 + C^2 - 2BC\cos\alpha}$ gives $$T = k \cdot B \cdot C \sin\alpha \cdot \left(1 + \frac{P - |C - B|}{\sqrt{B^2 + C^2 - 2BC\cos\alpha}}\right) \quad (1)$$

Figure 3:
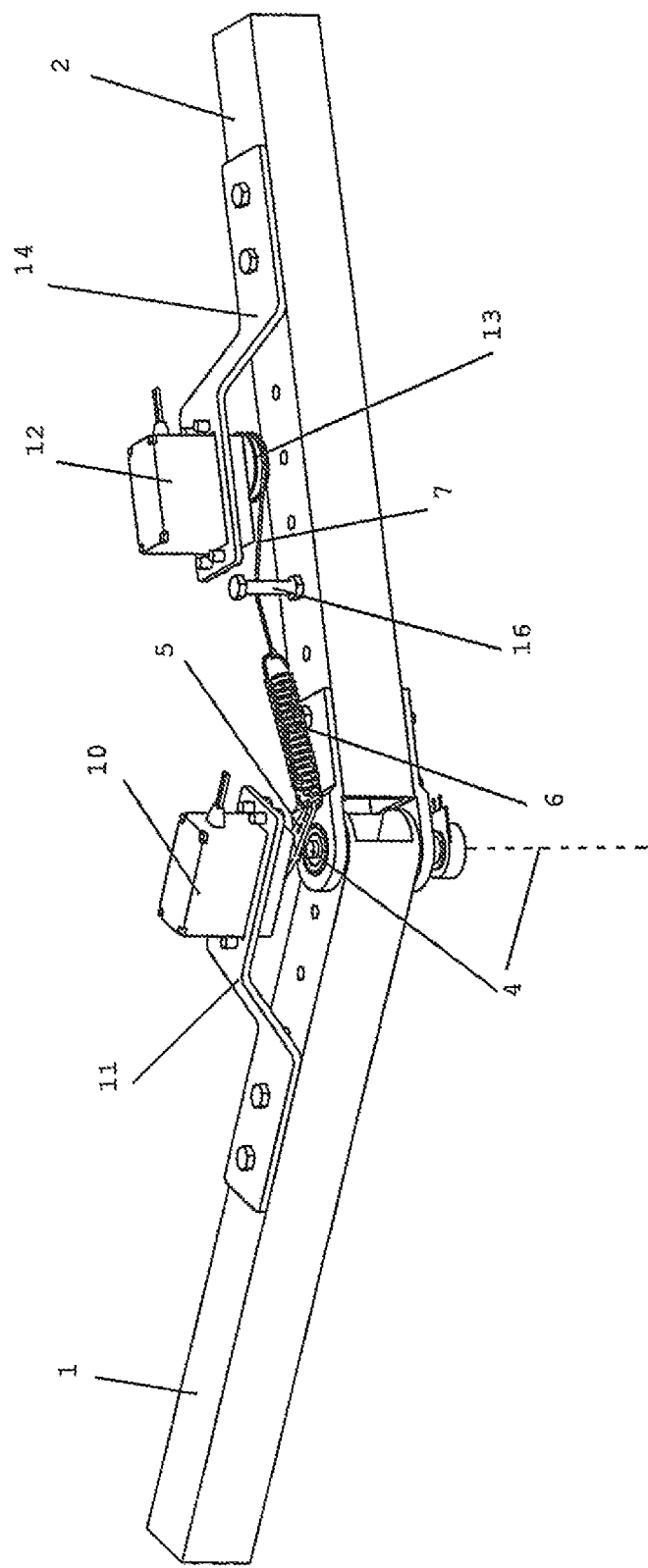
FIGS. 3 and 5 show images of two embodiments of the joint according to the invention.

A first embodiment of the articulated joint according to the invention is shown in FIG. 3. According to the preferred embodiment of the invention, the actuator which drives the rotation of the lever arm 5 is a position controlled actuator e.g. a servomotor, a hydraulic or pneumatic actuator or the like. In the embodiment of FIG. 3, this actuator that sets the angle φ is a servomotor 10, mounted on a bracket 11, which is fixed to the left arm 1, so that the servomotor's rotation axis coincides with the rotation axis 4 of the joint. Fixed to the rotation axis of the servomotor, is the lever arm 5, which can thus be rotated with respect to the left arm by the servomotor 10. In the embodiment shown in FIG. 3, the pre-tension mechanism consists of a second servomotor 12, with a spool 13 fixed on the axis of the motor. The second servomotor is mounted on the right arm via a second bracket 14. The cable 7 is connected to the spool 13 so that it can be wound up or down by actuating the motor 12. The cable is further guided around a protrusion 16 (e.g. a bolt or a pulley) mounted on the right arm, and defining the point 18 (see FIG. 1). By actuating the second servomotor 12, and winding up the cable onto the spool, the spring 6 can be elongated independently of the movement of the joint. This way, the joint's compliance can be controlled separately from its movement, as described above. According to the preferred embodiment, the protrusion 16 is placed in such a way that the cable remains in contact with this protrusion, regardless of the angular position of the arms 1, 2 and 5 (thus always passing through point 18). Alternatively, a set of rolls or protrusions may be used on either side of the cable, so that the cable is forced to pass through the same point, whatever the angular position is.

Figure 4:
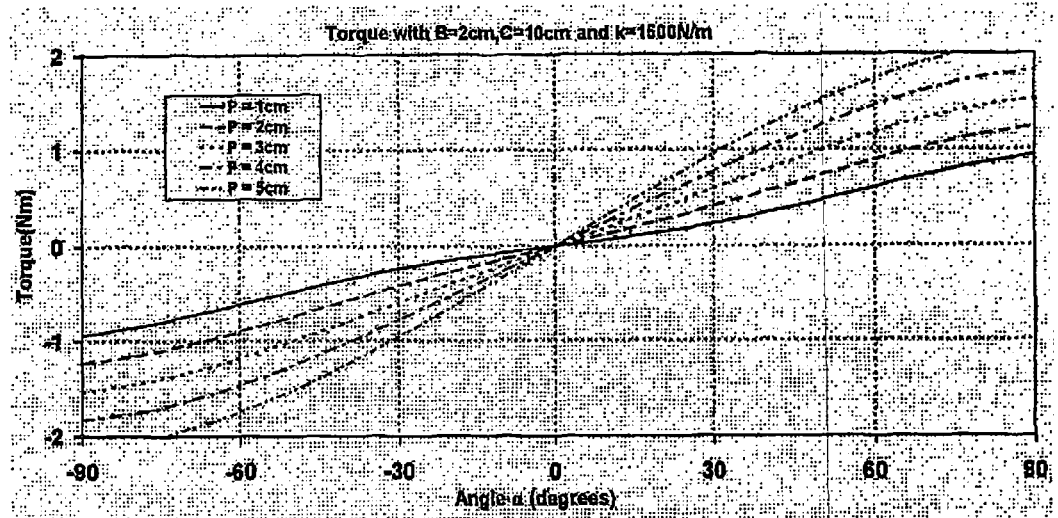
FIG. 4 shows a graph illustrating the influence of the angle α on the torque.

FIG. 4 shows the torque generated by the joint of FIG. 3 when the pre-tension is altered. The torque is seen to be symmetrical around the equilibrium position, as well as being independent from the angle $\phi$ (see formula (1)), which means the compliance and equilibrium position can be controlled independently. Furthermore, one can see that around the equilibrium position, for a range of about $-45°$ to $+45°$, the plot is rather linear for a B/C ratio of 5 (see further in text).

Figure 5:
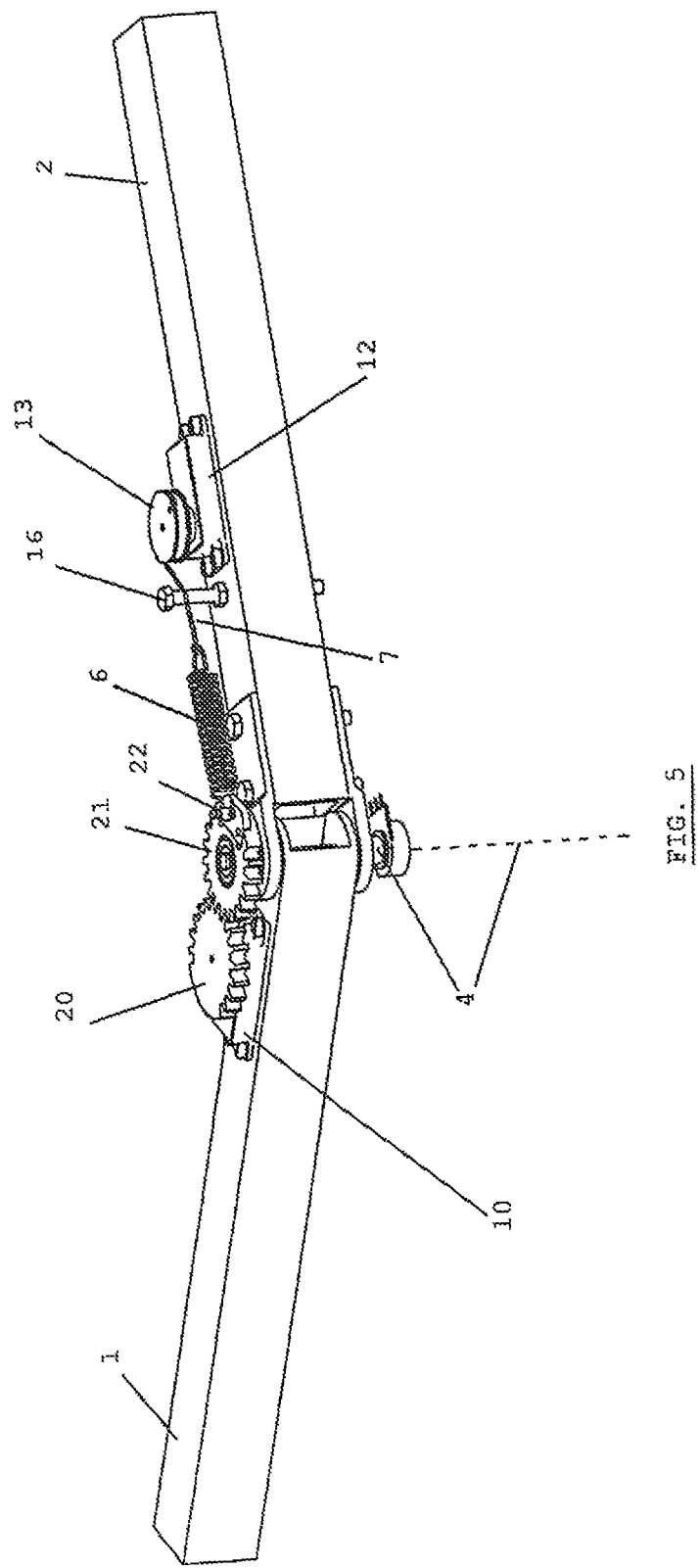

A second and improved embodiment of the mechanism is shown in FIG. 5. In this case, the actuator which sets the angle $\phi$ is again a servomotor 10, but it now actuates the rotation of a first gear wheel 20, arranged in co-operation with a second gear wheel 21, rotatably mounted on the rotation axis 4 of the articulated joint. The servomotor 19 is mounted directly onto the left arm 1. The second gear wheel 21 now plays the part of the third body (the lever arm) in appended claim 1. The spring 6 is connected to the second gear wheel 21 in an eccentric point 22, so that the second gear wheel, and more precisely the radius between the rotation point 3 and the eccentric point 22, plays the role of the lever arm 5 (see detail in FIG. 6). In the embodiment of FIG. 5, the same pre-tension mechanism is used as in FIG. 3, but the servomotor 12 is now mounted directly on the right arm. In the embodiment of FIG. 5, the actuator 10 is not directly coupled to the third body (the gear wheel 21) but through a transmission means, in this case the gearing mechanism 20,21. Other transmission means may be used to drive the rotation of the third body, such as a belt, chain, cable or the like.

The scope of the invention is not limited to the embodiments shown in FIGS. 3 and 5. For example, the pre-tension mechanism may be produced in a different way, for example by employing the bracket 14 and servomotor 12 of FIG. 3, but with a second lever arm connected to that motor, in stead of a spool. The cable would then be attached to a point on that second lever arm.

Figure 7:
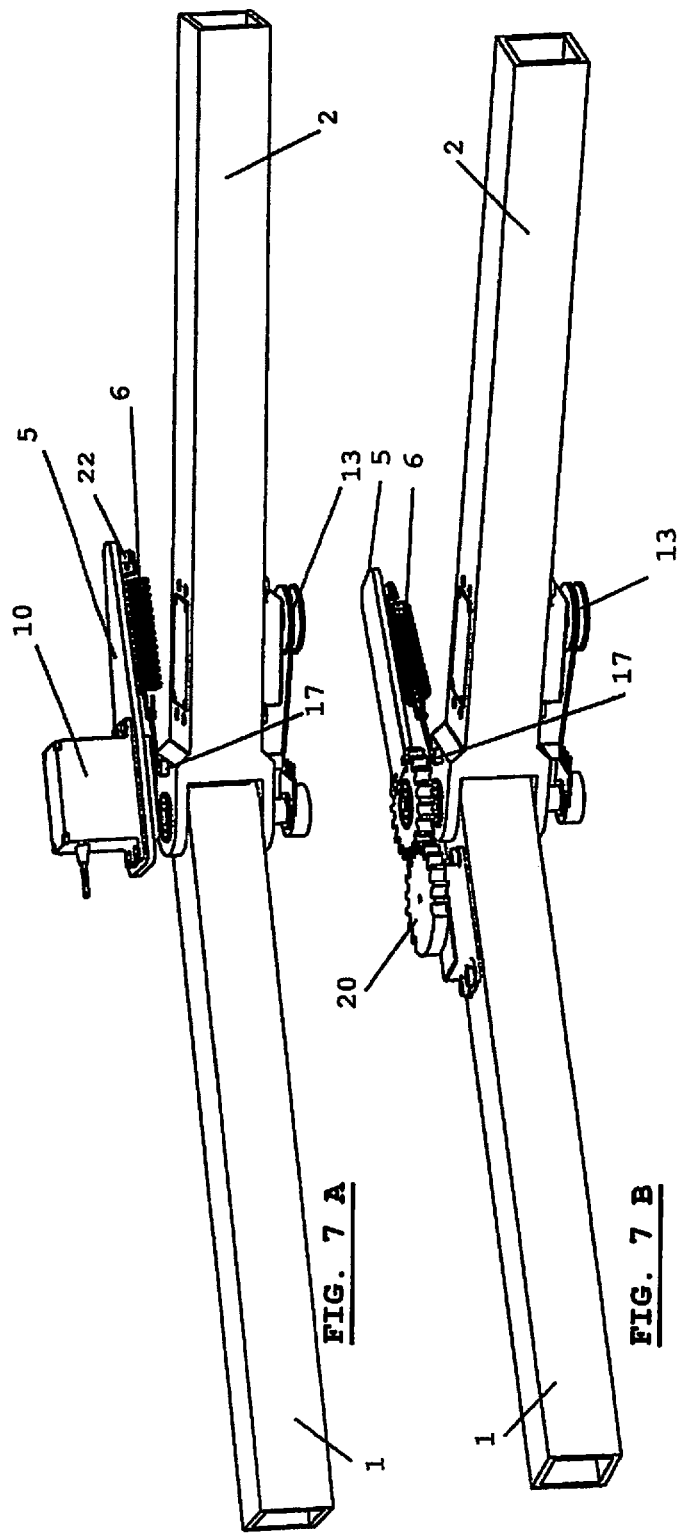
FIG. 7 shows in FIGS. 7A and B two embodiments of a more compact version of the joint according to the invention.

The formula (1) of the torque shows that the parameters B and C can be exchanged, without changing the value of the torque T. This results in 2 options: when the C/B ratio $>=1$ it is the standard variant as described before; when C/B ratio$<1$ it results in the compact variant. FIGS. 7A and B show two embodiments of the compact variant.

Figure 6:
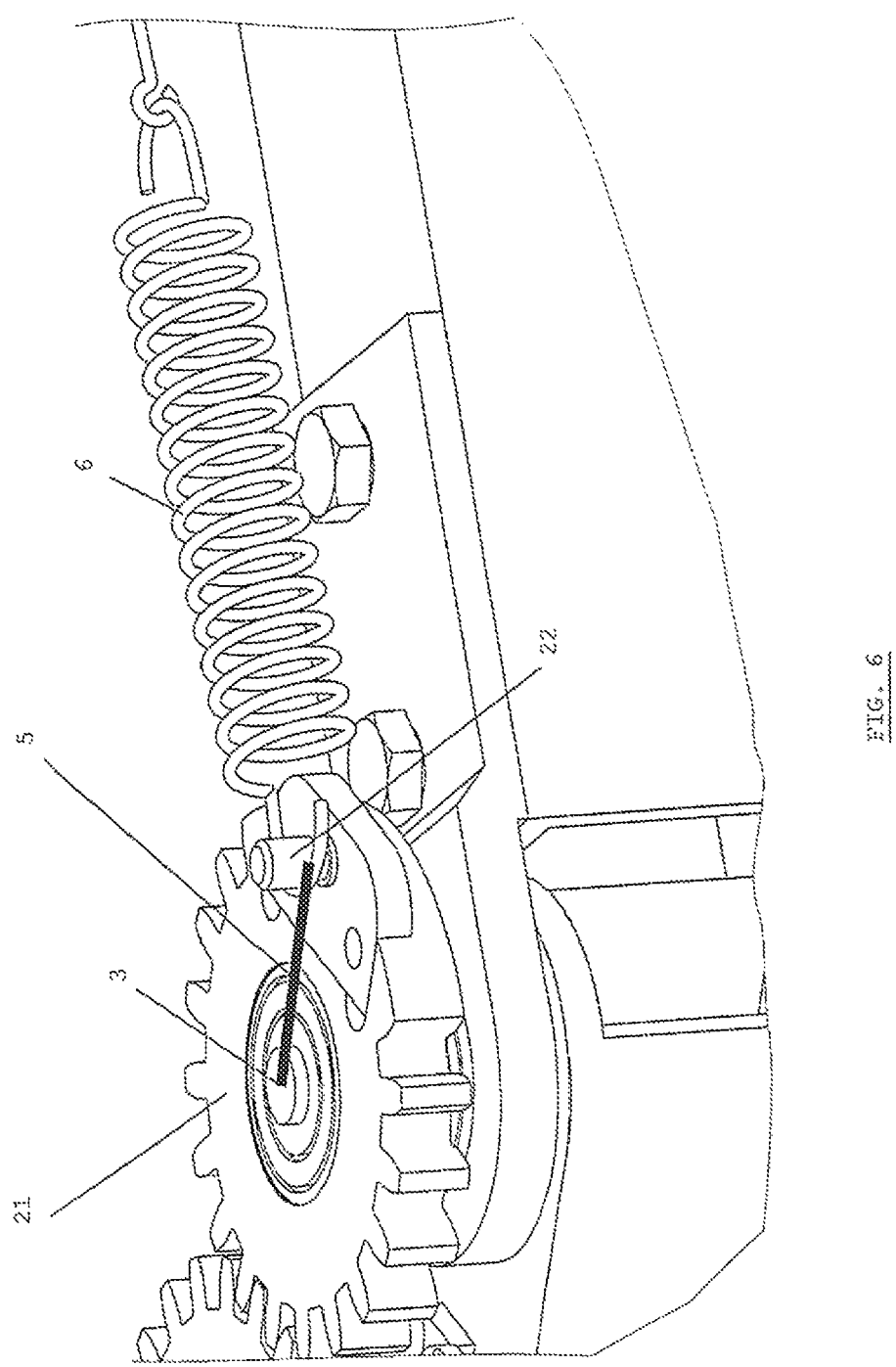
FIG. 6 shows a detail of the mechanism of FIG. 5.

It can be shown that the joint behaves in a more linear way when B and C differs more, resulting in a preferred value of the B/C ratio, or C/B ratio, of at least 1.5. According to a particular embodiment, the ratio B/C or C/B is larger than 5. The standard variant requires a certain length on one of the bodies for the length C plus the length of the pre-tension mechanism. In the compact variant the spring with cable is connected to the lever arm 5 and goes to a point on the right arm closer to the rotation axis. To change the direction of the cable in this point, it can slide in a hole 17 through the right arm, the inside surface forming a pipe with low friction coefficient (e.g. Teflon), as shown in FIG. 6, or by using a mechanism with two pulleys, one on either side of the cable 7, which can rotate around 2 axes. This solution is more complex, but has less friction.

As explained above, the lever arm is attached to the first body in a rotation centre 3, which is preferably a point on the rotation axis 4 around which the first and second body rotate. However, the third body could be attached to the first body 1 in a different rotation point, which will however result in a coupling between the equilibrium position and the compliance of the joint. According to the preferred embodiment however, these parameters can be controlled independently, by arranging the third body to be rotatable around the same axis as the first and second body, or at least around an axis intersecting with the axis around which the first and second body are rotatable (in which latter case the third body would rotate with respect to the first body in a plane differing from the second body).

Figure 8:
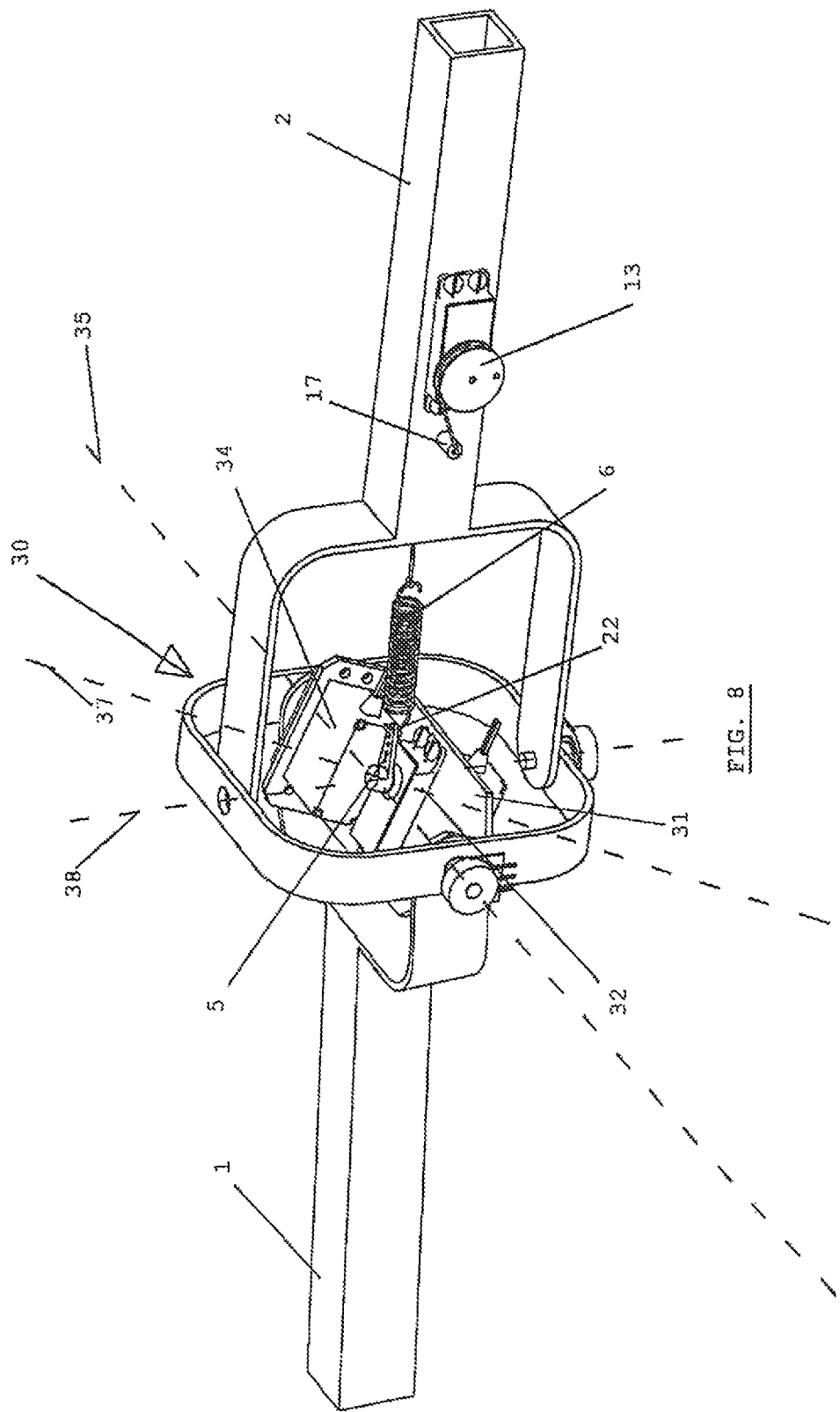
FIG. 8 shows a joint according to the invention, with two rotational degrees of freedom, and one spring to set the compliance of the joint.

The invention is equally related to a joint with more than one degree of freedom. FIG. 8 shows a joint with 2 rotational degrees of freedom (2Dof). The right arm 2 can rotate with respect to the left arm 1 around two perpendicular axes 35 and 38, through the use of a cardan coupling 30. Inside the cardan coupling, and arranged rotatably around one axis 35, is a plate 31, on which a servomotor 32 is mounted, carrying on its axis a lever arm 5, so that the rotation of the lever arm with respect to the plate 31, and around an axis 37 perpendicular to the plate, is actuated by this first servomotor 32. A second servomotor 34 actuates the rotation of the plate itself around axis 35. This way, the plate 31 forms a kind of internal cardancoupling inside the exterior cardan coupling 30. A spring 6 is connected to a fixed point 22 on the lever arm 5, and further, via guiding hole 17, to a pre-tension means 13 mounted on the right arm 2, in the manner described above for the joint with one rotational degree of freedom. The lever arm can thus be rotated around two perpendicular axes 35 and 37, relative to the left arm, thereby setting an equilibrium position with respect to these perpendicular rotation axes. The right arm will then be drawn into this equilibrium position by the resulting torque, more precisely by its two components in two perpendicular planes. Due to the presence of only one spring 6, the compliance of said rotation in one plane is not independent of the compliance in the other plane.

Figure 9:
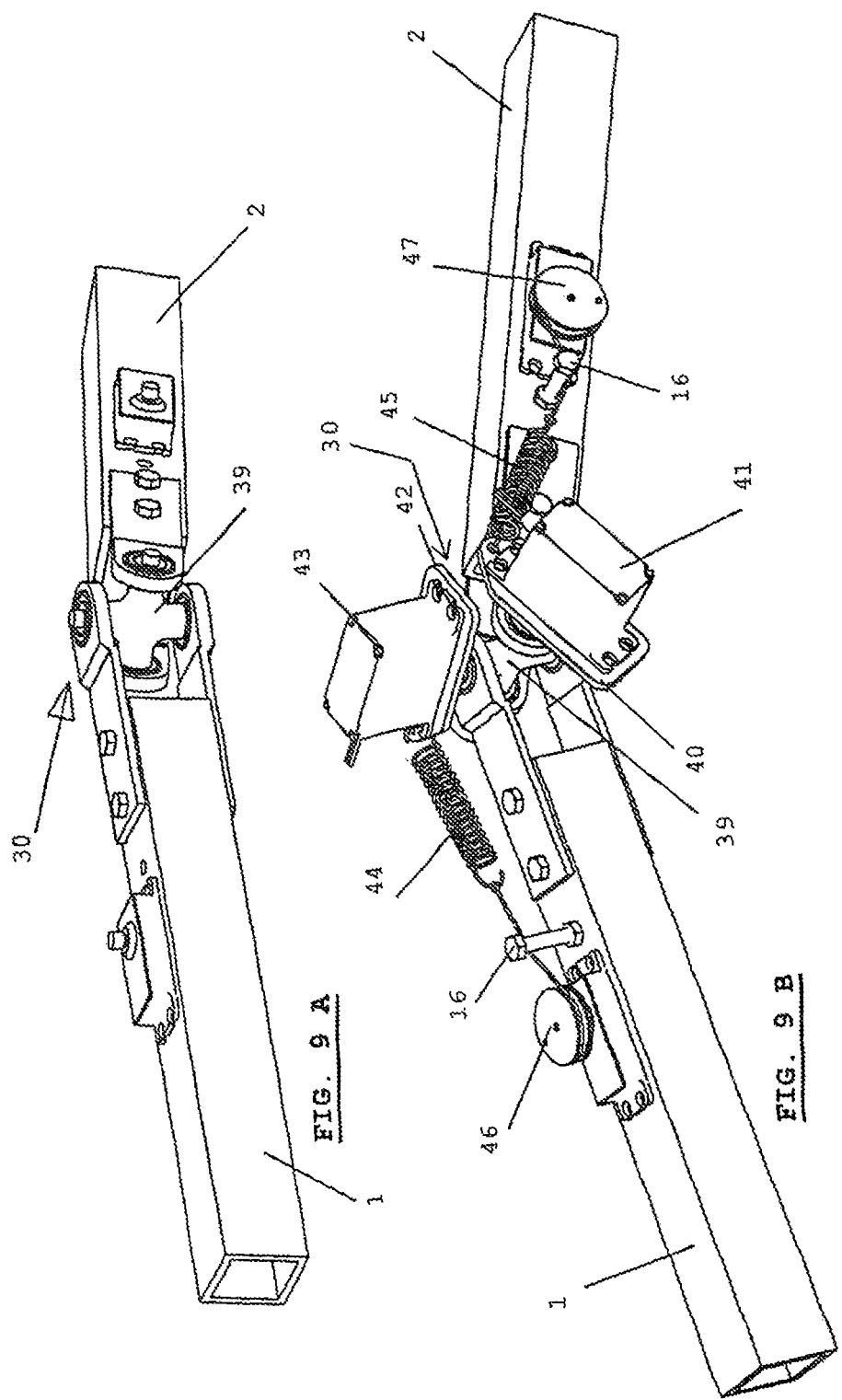
FIG. 9 shows in FIG. 9A a joint according to the invention, with two rotational degrees of freedom.

FIG. 9 shows a version with 2 rotational degrees of freedom, and wherein the compliance can be controlled independently in the two planes. The setup is actually a combination of two 1Dof setups, but one is rotated over 90 degrees. Once again, the arms are coupled by a cardan coupling 30, shown more visibly in FIG. 9A, which shows the joint without the equilibrium position actuators on it. The cardan coupling in this embodiment is equipped with a cross-piece 39. We now refer to FIG. 9B, which shows the complete joint. A first platform 40 is mounted rotatably with respect to the cross-piece 39 of the cardan coupling. The first platform 40 is rotatable around a first axis. A second platform 42 is mounted rotatably with respect to said cross-piece 39, and is rotatable around a second axis, perpendicular to the first. Onto the first platform a servomotor 41 is mounted, to actuate the rotation of the platform around said first axis. Onto the second platform, a servomotor 43 is mounted, to actuate the rotation of the second platform around said second axis. To a fixed point on each platform, two springs 45 and 44 are respectively attached, and connected via two cables to two pre-tension mechanisms, e.g. servomotor/spool combinations 47 and 46, such as described for the 1Dof-version. In this embodiment however, one servomotor/spool combination is mounted on each of the arms. In this embodiment therefore, the rotation around one axis takes place in the exact same way as in the 1Dof case described above: the right arm 2 is brought into the equilibrium position defined by a rotation of the platform (acting as lever arm) 40. For the rotation around the perpendicular axis, the role of the two arms is reversed. This resulting system therefore works as a combination of two 1Dof-joints, rotated over 90°: actuating the motors 41 and 43 sets the equilibrium position with respect to two perpendicular rotation axes. This creates a torque, which will bring the arms into that equilibrium position through a combined rotation around the two axes. In the embodiment of FIG. 9, the compliance of the rotation around one axis can be controlled independently from the compliance of the rotation around the other axis.

Figure 10:
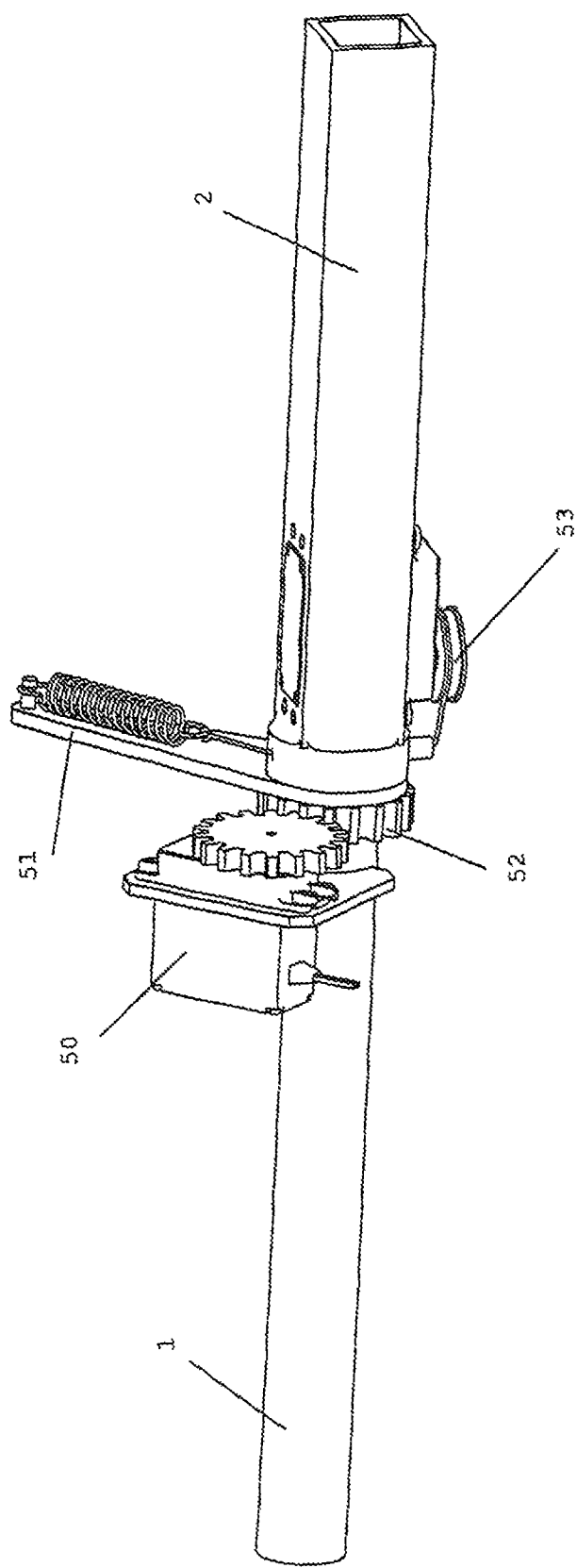
FIG. 10 shows a joint with an adaptable compliance of the rotation around a longitudinal axis.

The logical continuation is the 3-degrees of freedom joint or spherical joint with controllable stiffness. Here the same options as in de 2Dof case apply: optimize for controllability or for number of motors. The option where all three compliances are the same is more difficult to realize and less useful; more interesting are the option, where all three are independent, and the option, where the compliance around two axes is the same and independent from the compliance around the third axis. Note that the rotation axes in case of the 2Dof embodiments are perpendicular to the main axis of the left or right body. Calling these rotation axes X and Y, a 1Dof joint around the Z-axis can be added, thus building a 3Dof spherical joint with adaptable compliance. A possible embodiment is shown in FIG. 10. To make the setup as compact as possible the compact embodiment is chosen. In FIG. 10 a servomotor 50 placed on the left arm 1 actuates the central body, being the lever arm 51 with gear wheel 52. The pre-tension mechanism 53 is placed on the right arm 2. By adding this embodiment to one of the previous 2Dof designs, a 3Dof joint is created.

In all the embodiments shown above, the pre-tension mechanism is mounted onto body 2. However, the pre-tension mechanism can be placed on either body 1, 2, 5 or even between body 2 and body 5. In FIG. 11a the pre-tension mechanism (referenced 60) and the spring 6 are arranged directly between point 18 on the right arm 2 and point 22 on the lever arm 5, i.e. without the pre-tension mechanism being mounted on one the rotating bodies. In this case no friction is introduced by the cable running over a pulley, or sliding over a protrusion. In FIG. 11b the pre-tension means is placed on the second body 2, as in the embodiments shown above. FIG. 11c shows the placement of the pre-tension mechanism on the lever arm 5. Embodiments shown in FIGS. 11b and 11c have both one point (18 or 22 respectively) where the direction of the cable is changed by a guiding means, introducing friction in this point. In FIG. 11b this angle variation is small, while being much larger in FIG. 11c. The embodiments shown in FIGS. 11d and 11e are the most complex. To put the pre-tension means on body 1, the cable has to be guided around 2 guiding means: at point 22 and by an extra protrusion 61 at the rotation centre (FIG. 11d) or at point 18 and by an extra protrusion 61 at the rotation centre. This introduces more friction. Since the body 2 can move in both directions, two simple pulleys can not guide the cable in that case. The cable should be guided in such a way that the length of the path between the pre-tension mechanism and point 18 on body 2 (FIG. 11e) or point 22 on body 5 (FIG. 11d) does not change when the equilibrium position is changed. For this purpose, in the case of FIG. 11d, for example the guiding means at 22 and 61 should be produced in such a way that the cable passes through these points, regardless of the angle between bodies 1, 2 and 5, for example by providing a protrusion on both sides of the cable, thereby forcing the cable to pass through the point.

Figure 11:
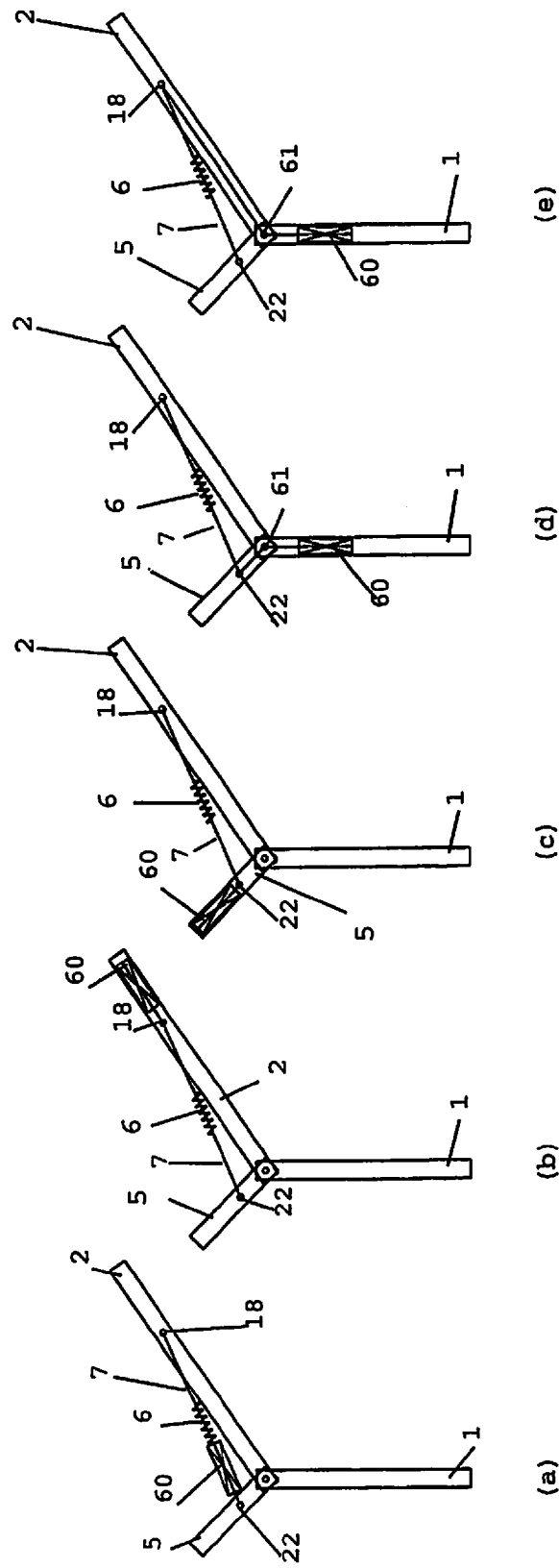
FIG. 11 shows a number of alternative versions of a joint according to the invention.
Figure 12:
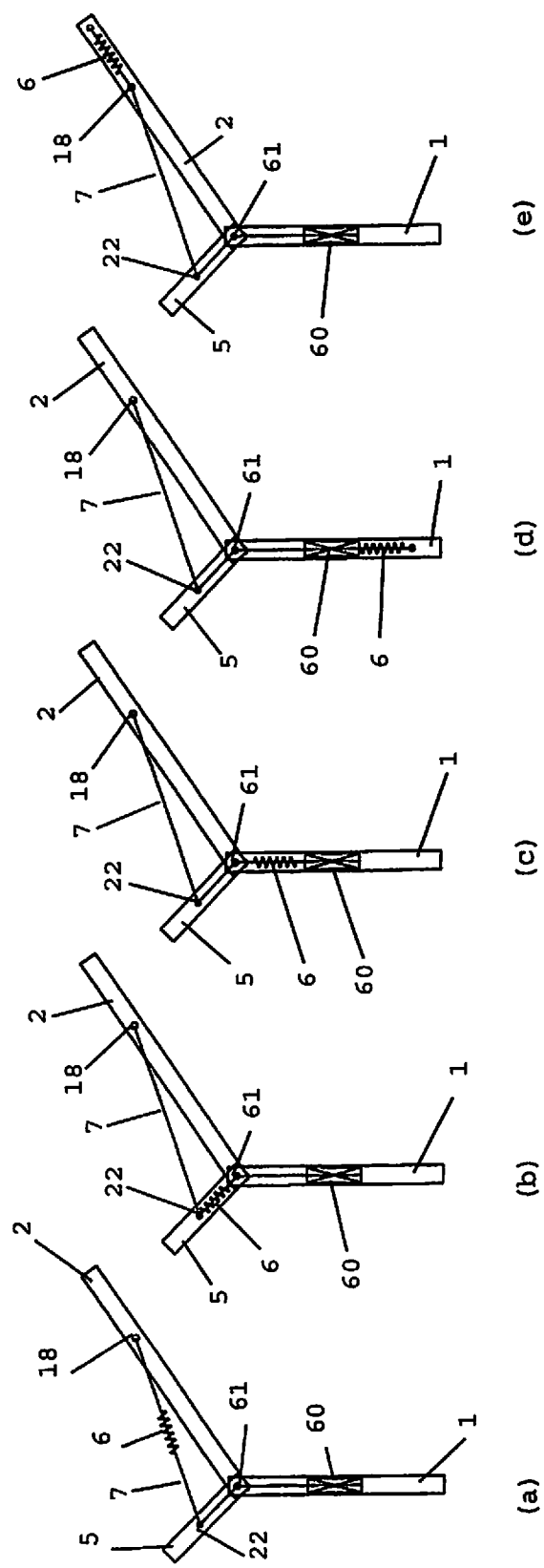
FIG. 12 shows a number of different locations of the spring in a joint according to the invention.

The spring 6 may be placed between the points 16 and 22, as shown in FIG. 11. However, it may equally be placed outside these points, as illustrated in FIG. 12, for the specific case of the joint shown in FIG. 11d. In the other cases of FIG. 11, analogue alternatives are clear for the skilled person.

In general, the spring may be placed anywhere along the path defined by the cable 7. The spring may equally be placed on the other side of the pre-tension means, as seen from the rotation axis (FIG. 12d), in which case the pre-tension means may be designed as a hydraulic piston or the like, whose movement can cause compression or elongation of the spring. The spring may also be placed between a fixed point on the second body (FIG. 12e) and the point 18 defined by the guiding means, or equivalently on the lever arm (between a fixed point and the point 22).

An articulated joint according to the invention represents an improvement with respect to existing joints controlled by a stiff actuator, in that the joint has an adaptable compliance, independently controllable of the equilibrium position. This adaptable compliance and thus adaptable eigenfrequency of the joint provides an improvement with respect to predetermined dynamic behaviour of the above-mentioned 'passive walkers'.

Other potential applications of the present invention lie in the field of limb prostheses, industrial robots with enhanced safety characteristics, robotic toys, step rehabilitation aiding robots, etc. A general advantage is the improved safety of robotic appliances equipped with compliant joints according to the invention, due to a reduced risk of accidents caused by heavy and stiff equipment. At the same time, the compliant joint according to the invention does not preclude an accurate positioning of the actuated arms: a joint with adaptable compliance can be stiff for exact positioning and low speeds (grasping an object) and compliant when positioning is not that important or at higher speeds (moving from one position to another).

The invention claimed is:

1. An articulated joint comprising a first body and a second body joined together so that one body is able to perform a pivoting motion with respect to the other body around a pivoting axis, wherein the joint further comprises:

a third body coupled to the first body such that the third body pivots with respect to the first body at the pivoting axis and defining a lever arm having a point on the third body offset from the pivoting axis;

an actuator coupled to the first body and to the third body and operable to set an angle between the third body and the first body by pivoting the third body with respect to the pivoting axis of the first body, wherein the actuator can set the angle between the third body and the first body independent of movement of the first body;

an elastic element, wherein the elastic element is arranged for exerting a force between the point on the third body and a point on the second body offset from the pivoting axis, wherein the elastic element is capable of being pre-tensioned with a varying pre-tension by a pre-tension mechanism, such that the force exerted by the elastic element on the second body is due to an angle between the second body and the third body on the one hand, and to the pre-tension of the elastic element on the other hand; and the pre-tension mechanism is operable for changing the pre-tension of the elastic element independent of the angle between the first body and the third body by changing an elongation of the elastic element, wherein, when the actuator is controlled to pivot the third body with respect to the pivoting axis of the first body, the force exerted by the elastic element between the second body and the third body generates a torque on the second body that moves the second body towards the third body with a compliance that is adaptable by the pre-tension mechanism changing the pre-tension of the elastic element.

2. The articulated joint according to claim 1, wherein said pre-tension mechanism and said elastic element are arranged directly between said point on the third body and said point on the second body.

3. The articulated joint according to claim 1, wherein said elastic element is connected to the pre-tension mechanism via a cable, wherein the pre-tension mechanism is mounted on a body selected from the group consisting of: the second body and the third body, and wherein the cable is guided around a guide present on the body on which the pre-tension mechanism is mounted and placed so that the cable passes through the point on the body on which the pre-tension mechanism is mounted, regardless of the relative position of the first body and the second body.

4. The articulated joint according to claim 3, wherein said elastic element is located at a location selected from the group consisting of:
   between said point on the second body and said point on the third body;
   between the pre-tension mechanism and said guide;
   distal of the pre-tension mechanism, as seen from the pivoting axis;
   between a fixed point on the second body and the guide; and
   between a fixed point on the third body and the guide.

5. The articulated joint according to claim 3, wherein said guide is selected from the group consisting of: a pulley, a protrusion, a hole and a set of pulleys arranged on either side of the cable, thereby forcing the cable to pass through a point.

6. The articulated joint according to claim 1, wherein said elastic element comprises a spring.

7. The articulated joint according to claim 6, wherein the spring is linear.

8. The articulated joint according to claim 1, wherein the actuator operable to set the angle between the third body and the first body is a servo-actuator with position feedback.

9. The articulated joint according to claim 1, wherein the pre-tension mechanism comprises a rotating spool, arranged to be actuated by a second actuator able to cause winding or unwinding of a cable onto or from said rotating spool, and wherein said second actuator is a rotational actuator.

10. The articulated joint according to claim 1, wherein a first distance between the pivoting axis connecting the first body and the second body and said point on the second body and a second distance between the pivoting axis of the third body and said point on the third body are such that a ratio of the first distance to the second distance is greater than 1.5.

11. The articulated joint according to claim 1, wherein said actuator is mounted on a bracket, so that the actuator has a rotation axis coinciding with the pivoting axis of the articulated joint, and wherein said third body is a lever arm placed directly on the actuator.

12. The articulated joint according to claim 1, wherein said actuator arranged for controlling the pivoting of the third body is coupled to the third body through a transmission coupling.

13. The articulated joint according to claim 12, wherein the third body is a gearwheel, which forms a part of a gearing mechanism.

14. The articulated joint according to claim 1, wherein:
   the second body is able to pivot with respect to the first body around the pivoting axis and a second pivoting axis;
   said first body and the second body are coupled by a cardan coupling;
   the third body is mounted for pivoting with respect to a plate on the pivoting axis, perpendicular to said plate; and
   said plate is arranged for pivoting on the second pivoting axis.

15. The articulated joint according to claim 1, wherein:
   the second body is able to rotate with respect to the first body around the pivoting axis and a second pivoting axis;
   said first body and the second body are coupled by a cardan coupling equipped with a cross-piece;
   said third body is mounted pivotally with respect to said cross-piece, whilst being connected through the spring to the pre-tension mechanism on the second body;
   a fourth body is mounted pivotally with respect to said cross-piece, whilst being connected through a second spring to a second pre-tension mechanism on the first body; and
   an additional actuator is arranged to actuate pivoting of the fourth body with respect to the cross-piece.

16. The articulated joint according to claim 1, wherein the first body is an elongated arm, and wherein the pivoting axis is essentially parallel to said elongated arm, so that a pivoting motion of the second body around said axis parallel to the elongated arm may be actuated.

17. The articulated joint according to claim 1, wherein:
   said elastic element is connected to the pre-tension mechanism via a cable;
   the pre-tension mechanism is mounted on the first body; and
   the cable is:
      guided around a first guide, placed at the pivoting axis in such a way that the cable passes through said pivoting axis, regardless of the relative position of first body and the second body; and
      guided around a second guide present on a body selected from the group consisting of: the second body and the third body, and placed so that the cable passes through said point on the selected body comprising the second guide regardless of the relative position of the first body and the second body.

18. The articulated joint according to claim 17, wherein said elastic element is located at a location selected from the group consisting of:
   between said point on the second body and said point on the third body;
   between the pre-tension mechanism and the first guide;
   between the pre-tension mechanism and the second guide;
   between the first and the second guide;
   distal of the pre-tension mechanism, as seen from the pivoting axis;
   between a fixed point on the second body and said first guide;
   between a fixed point on the third body, and said first guide;
   between a fixed point on the second body and said second guide; and
   between a fixed point on the third body, and said second guide.

19. The articulated joint according to claim 17, wherein said first guide and the second guide are selected from the group consisting of: a pulley, a protrusion, a hole, and a set of pulleys arranged on either side of the cable, thereby forcing the cable to pass through the point on the selected body.

20. The articulated joint according to claim 17, wherein a distance B between the pivoting axis connecting the first body and the second body and said point on the second body and a distance C between a pivoting axis of the third body and said point on the third body are such that a ratio C/B is greater than 1.5.

21. An articulated joint according to claim 1, wherein the pre-tension mechanism comprises a linear actuator.

22. The articulated joint of claim 1, wherein the pre-tension mechanism comprises a second actuator operable to change an elongation of the elastic element.

23. The articulated joint of claim 1, wherein the first, second and third bodies are each formed of a rigid link.

24. The articulated joint of claim 1, wherein the pre-tension mechanism is arranged for changing the pre-tension of the elastic element independent of the relative position between the first body and the second body.

25. An articulated joint comprising a first body and a second body joined together so that one body is able to perform a pivoting motion with respect to the other body around a pivoting axis, wherein the joint further comprises:
  a third body coupled to the first body such that the third body pivots with respect to the first body at the pivoting axis and defining a lever arm having a point on the third body offset from the pivoting axis;
  an actuator coupled to the first body and to the third body and operable to set an angle between the third body and the first body by pivoting the third body with respect to the pivoting axis of the first body, wherein the actuator can set the angle between the third body and the first body independent of movement of the first body;
  an elastic element, wherein the elastic element is arranged for exerting a force between the point on the third body and a point on the second body offset from the pivoting axis; and
  a pre-tension mechanism operable to biasing the elastic element in a variable amount, wherein the pre-tension mechanism can change a biasing force of the elastic element independent of the angle between the first body and the third body by changing an elongation of the elastic element, such that the force exerted by the elastic element on the second body is due to an angle between the second body and the third body on the one hand, and to the biasing force of the elastic element on the other hand,
  wherein, when the actuator is controlled to pivot the third body with respect to the pivoting axis of the first body, the force exerted by the elastic element between the second body and the third body generates a torque on the second body that moves the second body towards the third body with a compliance that is adaptable by the pre-tension mechanism changing the biasing force of the elastic element.

26. The articulated joint of claim 25, wherein the first, second and third bodies are each formed of a rigid link.

27. The articulated joint of claim 25, wherein the pre-tension mechanism can change the biasing force of the elastic element independent of the relative position between the first body and the second body.

* * * * *